(12) United States Patent
Ly (10) Patent No.: US 10,675,125 B1
(45) Date of Patent: Jun. 9, 2020

(54) DENTAL APPLIANCE SEATING TOOL

(71) Applicant: PUL Technologies, LLC, San Leandro, CA (US)

(72) Inventor: Jannet My Ly, San Francisco, CA (US)

(73) Assignee: PUL Technologies, LLC, San Leandro, CA (US)

( * ) Notice: Subject to any disclaimer, the term of this patent is extended or adjusted under 35 U.S.C. 154(b) by 0 days.

(21) Appl. No.: 16/455,663

(22) Filed: Jun. 27, 2019

(51) Int. Cl.
*A61C 3/00* (2006.01)
*A61C 7/02* (2006.01)

(52) U.S. Cl.
CPC . *A61C 3/00* (2013.01); *A61C 7/02* (2013.01)

(58) Field of Classification Search
CPC .................................... A61C 3/00; A61C 7/02
See application file for complete search history.

(56) References Cited

U.S. PATENT DOCUMENTS

| | | | | | |
|---|---|---|---|---|---|
| 2,594,830 | A | * | 4/1952 | Wade | A61C 9/00 433/71 |
| 4,869,669 | A | * | 9/1989 | Grubbs | A61C 5/00 433/140 |
| 5,232,362 | A | * | 8/1993 | Kanas | A61C 17/08 433/93 |
| 5,588,836 | A | * | 12/1996 | Landis | A61C 17/08 433/93 |
| 5,735,691 | A | * | 4/1998 | Fetter | A46B 17/02 15/145 |
| 5,924,866 | A | * | 7/1999 | Eldreth | A61C 17/08 433/140 |
| 6,332,776 | B1 | * | 12/2001 | Martin | A61B 1/247 433/140 |
| 7,066,735 | B1 | * | 6/2006 | Gasporra | A61C 5/90 433/140 |
| 8,152,525 | B2 | * | 4/2012 | Rossi, III | A61C 3/00 433/167 |
| 8,545,219 | B2 | | 10/2013 | Saubers | |
| 9,320,576 | B2 | * | 4/2016 | Pechersky | A61C 7/08 |
| 2003/0054320 | A1 | * | 3/2003 | Val | A61C 3/00 433/215 |
| 2008/0160473 | A1 | | 7/2008 | Li et al. | |

(Continued)

OTHER PUBLICATIONS

JES Orthodontics, "Aligner Chewies for Invisalign Trays—Green/Mint Scented—3 Chewies per Bag," undated, seven pages, [Online] [Retrieved on Aug. 1, 2019], Retrieved from the Internet <URL: https://www.amazon.com/Aligner-Chewies-Invisalign-Trays-Scented/dp/B016DUQTZA/ref=sr_1_5?crid=L2LO1S0B0DLU&keywords=aligner+chewies+for+invisalign+trays&qid=1564683647&s=gateway&sprefix=Aligner+Chewies+for+Inv%2Caps%2C390&sr=8-5>.

*Primary Examiner* — Ralph A Lewis
(74) *Attorney, Agent, or Firm* — Fenwick & West LLP (57) ABSTRACT

A dental appliance seating tool is configured for a person to bite and provides sufficient resistive force to aid in seating of a removable dental appliance. The seating tool includes top and bottom surfaces configured to respectively engage with top and bottom teeth of an individual. The seating tool also includes a front surface coupling the top surface to the bottom surface and a rear surface opposite the front surface. An interior wall defines a cavity within the volume defined by the top, bottom, front surface, and rear surfaces. The cavity has a front opening in the front surface and a rear opening in the rear surface. The cavity allows a shaft to pass through the front and rear openings, thus enabling the dental appliance seating tool to slide along the shaft.

20 Claims, 8 Drawing Sheets

(56) References Cited

U.S. PATENT DOCUMENTS

| | | | |
|---|---|---|---|
| 2008/0166684 A1* | 7/2008 | Kanas | A61C 17/08 433/93 |
| 2013/0130199 A1* | 5/2013 | Palm | A61C 3/00 433/173 |
| 2015/0190003 A1 | 7/2015 | Kelaher et al. | |

* cited by examiner

DENTAL APPLIANCE SEATING TOOL

BACKGROUND

1. Technical Field

The subject matter described relates generally to dentistry and, in particular, to tools for assisting individuals in correctly seating dental appliances.

2. Background Information

A wide range of removable dental appliances exist. Many times, these appliances are custom made to fit a patient's teeth for the purpose of orthodontia, maintaining teeth position, cosmetically treating teeth with dental bleach, or to replace full or partial dental arches. Examples of such appliances include clear aligners for teeth, removable braces for teeth, dental retainers, partial dentures, dentures, removable palatal expanders, and teeth whitening trays.

Although removable dental appliances can dramatically improve the cosmetic appearance or functionality (e.g., for speaking or eating) of a patient's mouth, many patients find fitting the appliance firmly and evenly difficult because of the pressure needed to correctly seat the appliance in place. If the dental appliance is not firmly, fully, and equally seated, it can become loosened fully or partially from the dental arch, cause mouth-discomfort, or become damaged. These problems can also cause social anxiety for patients with dental appliances such as partial or implant supported dentures.

For patients with clear aligners, the main concern is proper seating of the clear aligners so that their teeth will continue to track with each new pair. If tracking is not achieved, this can cause delays and extended treatment times. Patients are currently advised by dental professionals to seat these dental appliances into place by exerting equal pressure by hand, equal pressure by biting on a paper towel, or asking someone for assistance.

One disadvantage with these approaches is that a patient may not have the dexterity, strength, or mobility in their hands to firmly seat the appliance into its proper placement. Another disadvantage is that many patients are unable to apply equal and sufficient pressure to seat their dental appliance into their upper and/or lower arch, causing their appliance to possibly disengage. The concern for seating a dental appliance into the proper position in a patient's mouth is significant because it can cause damage to the appliance itself, cause gum and/or mouth discomfort, and delay treatment completion for patients in clear aligner therapy. Accordingly, a need exists for a device that provides a patient assistance with proper insertion of a dental appliance.

SUMMARY

The above and other problems may be addressed by a dental appliance seating tool that provides sufficient resistive force to aid in seating of a removable dental appliance when a person bites on it. The seating tool has a cavity running through it such that it can be placed on the shaft of a dental appliance removal tool having a hook on one end and handle on the other. The seating tool may slide up and down the shaft of the removal tool to allow the individual to adjust the placement of the seating tool according to their comfort, size of their mouth, and location of their dental appliance. The individual can then use the dental appliance removal tool as a handle, and direct the seating tool along the length of their dental appliance, biting on it at regular intervals, to firmly, evenly, and effectively seat their dental appliance into the prescribed position.

In one embodiment, the dental appliance seating tool includes top and bottom surfaces configured to respectively engage with top and bottom teeth of an individual. The seating tool also includes a front surface coupling the top surface to the bottom surface and a rear surface opposite the front surface. An interior wall defines a cavity within the volume defined by the top, bottom, front surface, and rear surfaces. The cavity has a front opening in the front surface and a rear opening in the rear surface. The cavity allows a shaft to pass through the front and rear openings, thus enabling the dental appliance seating tool to slide along the shaft.

Reference will now be made to several embodiments, examples of which are illustrated in the accompanying figures. It is noted that wherever practicable similar or like reference numbers are used in the figures to indicate similar or like functionality. In the following description, relative terms such as top, bottom, front, back, left, and right are used to describe the position of various elements. These terms re used for convenience and clarity and should not be construed as limiting the invention to any particular orientation. One skilled in the art will readily recognize from the following description that alternative embodiments of the disclosed structures may be employed without departing from the principles described.

DETAILED DESCRIPTION

Dental professionals may provide their patients with a dental appliance removal tool or patients may purchase such a tool independently to help remove their dental appliance. Patients typically carry their dental appliance removal tool in a dental appliance case, pocket, or another convenient location. Various embodiments of a dental appliance seating tool are configured to attach onto a dental appliance removal tool and slide along a shaft of the removal tool. This may help patients correctly position the seating tool. It may also reduce the likelihood of patients losing the seating device, which is relatively small and thus easily misplaced.

Example Dental Appliance Seating Tool

FIGS. 1 through 5 depict various views of an example embodiment of a dental appliance seating tool 100. The seating tool 100 includes a body made from a flexible and resilient material that is safe for oral use, such as food-grade plastic materials (e.g., BPA-free food-grade thermoplastic polyurethane). In one embodiment, the body of the seating tool 100 is molded as a single piece or molded in multiple pieces (e.g., a top portion and a bottom portion) and glued together using an adhesive that is safe for oral use. Alternatively, the seating tool 100 may be manufactured using any other suitable method, such as 3D printing, injection molding, or extrusion molding. The seating tool 100 provides a cushion that a patient can safely bite down on with sufficient force to correctly seat a dental appliance without damaging the dental appliance or causing discomfort in the patient's mouth.

Figure 1:
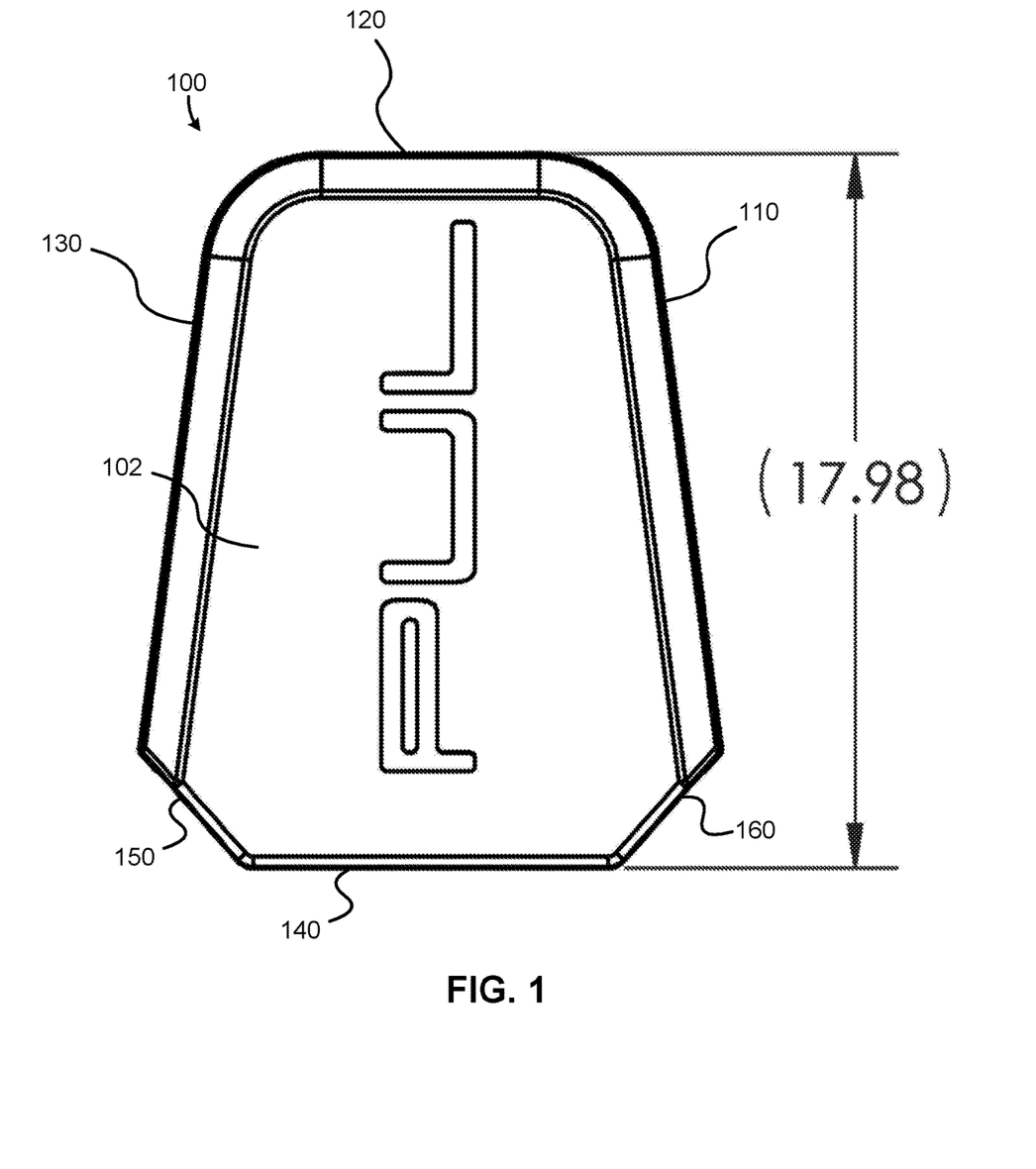
FIG. 1 is a top view of a dental appliance seating tool, according to one embodiment.

FIG. 1 is a top view of the example dental appliance seating tool 100. In the embodiment shown in FIG. 1, a top surface 102 of the seating tool 100 has a front edge 120 and a back edge 140 that are substantially parallel. The seating tool 100 may have a total length from the front edge 120 to the back edge 140 between ten millimeters (mm) and forty mm (17.98 mm in the case of the example shown in FIG. 1).

The top surface 102 also has a left edge 110 and a right edge 130 that may diverge from the front edge 120 toward the back edge 140 at an angle between zero degrees (i.e., not diverging) and twenty-five degrees. The left and right edges 110, 130 may connect to the front and back edges 120, 140 in various ways, including with sharp corners, rounded corners, or one or more additional edges at intermediate angles. In the example shown in FIG. 1, the left and right edges 110, 130 connect to the front edge 120 with rounded corners and the back edge 140 with a pair of additional edges 150, 160. In this case, the additional edges 150, 160 are at approximately forty-five degrees to the back edge 140, but other angles (e.g., between ten and eighty degrees) are possible.

Figure 2:
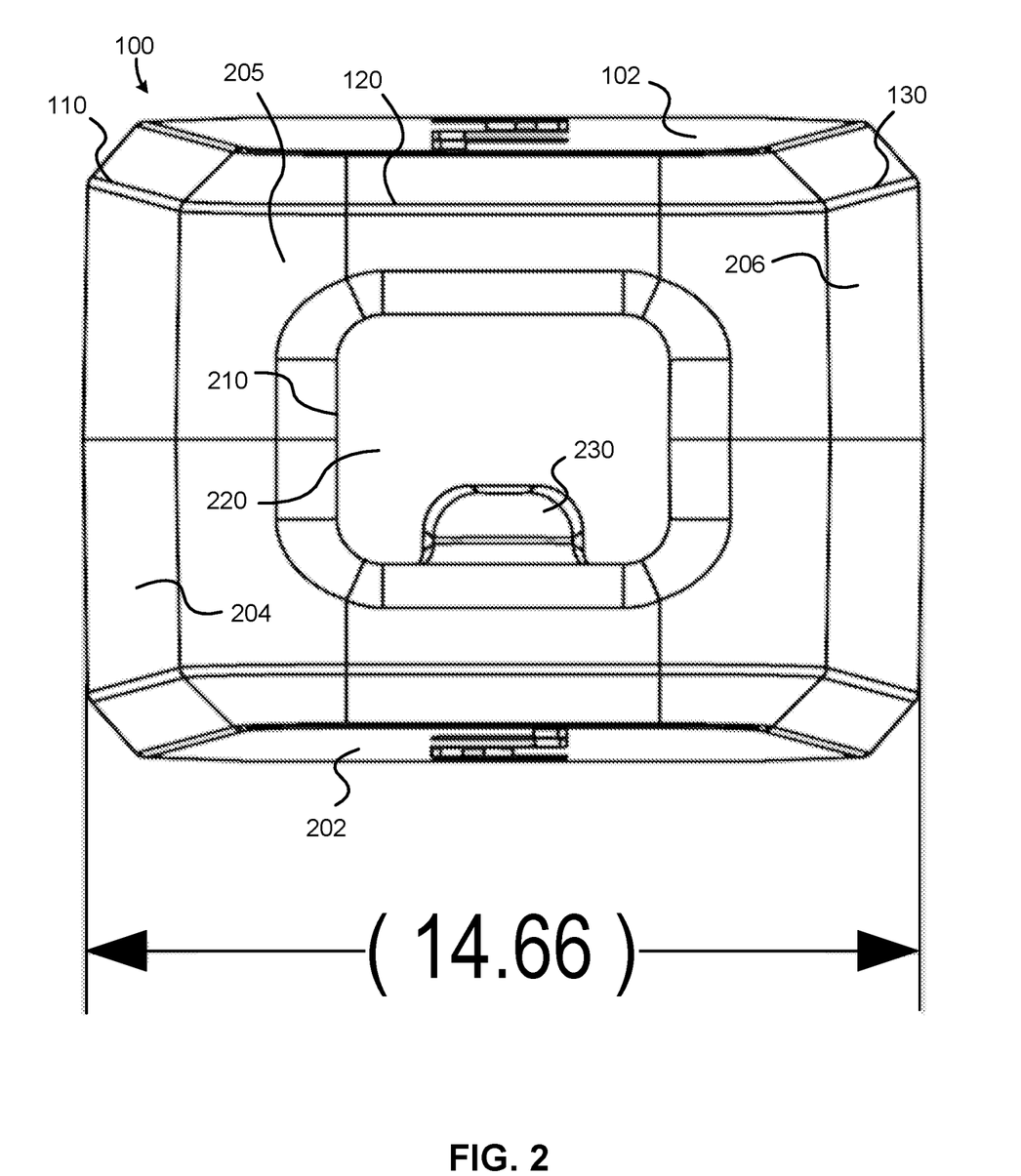
FIG. 2 is a front view of the dental appliance seating tool shown in FIG. 1, according to one embodiment.

FIG. 2 shows a front view of the example seating tool 100. The end of the top surface 102 and a bottom surface 202 of the seating tool 100 are connected by a front surface 205. On either side of the front surface 205, the top and bottom surfaces 102, 202 are connected by a left-side surface 204 and a right-side surface 206, which extend down from the left edge 110 and the right edge 130 of the top surface 102, respectively. The seating tool 100 may have a maximum width from the left-side surface 204 to the right-side surface 140 between ten mm and twenty mm (14.66 mm in the case of the example shown in FIG. 2). In some embodiments, the left-side surface 204 and the right-side surface 206 converge toward the front of the seating tool 100. Thus, the width of the front surface 205 may be less than the maximum width (e.g., between eight mm and fifteen mm).

In the embodiment shown, the left- and right-side surfaces 204, 206 are perpendicular to the top surface 102 and thus the top and bottom surfaces 102, 202 are substantially the same size and shape. However, in other embodiments, the top and bottom surfaces 102, 202 may be different sizes with one or both of the left- and right-side surfaces 204, 206 extending between them at angles other than ninety degrees.

The front surface 205 includes a front opening 210 into a cavity 220 within the seating tool 100. The opening 210 is large enough for a shaft of a dental appliance removal tool to pass through the opening, permitting the seating tool 100 to slide along the shaft. The combination of the seating tool 100 and removal tool is described in greater detail below, with reference to FIGS. 6 through 8.

Figure 3:
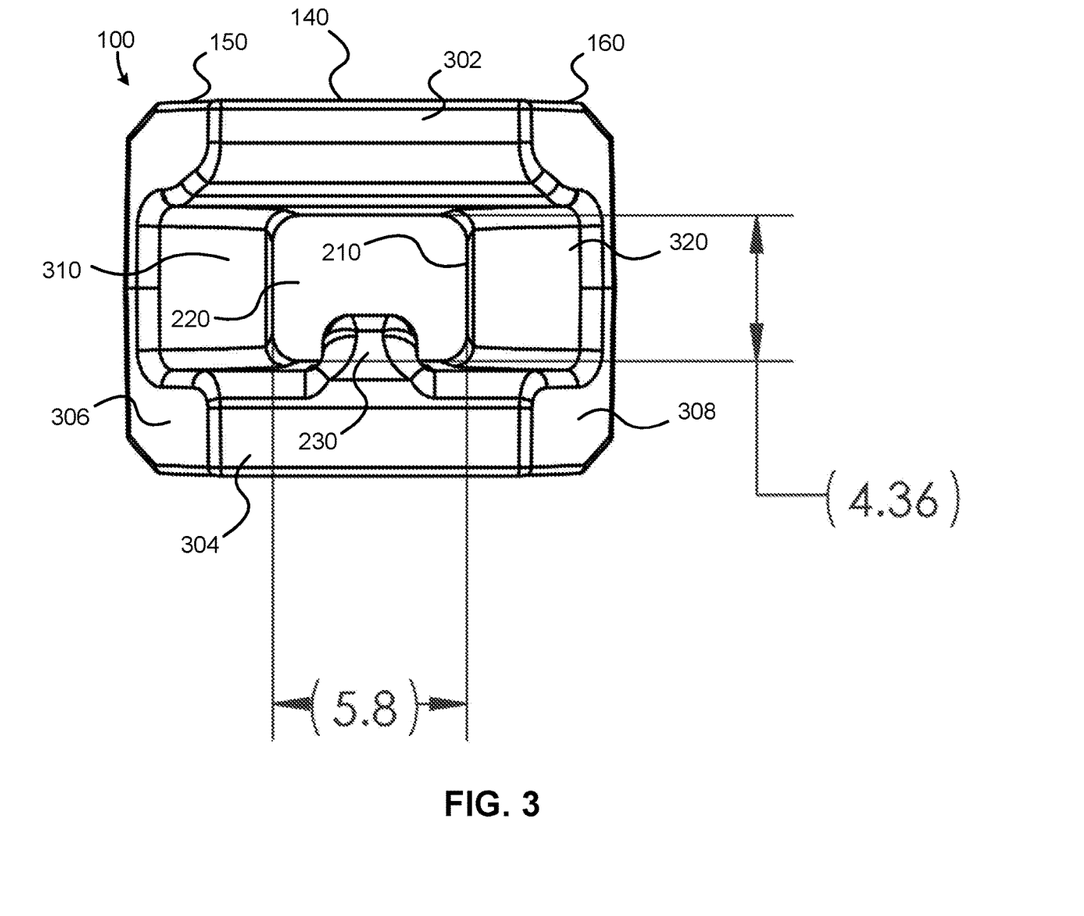
FIG. 3 is a rear view of the dental appliance seating tool shown in FIG. 1, according to one embodiment.

FIG. 3 shows a rear view of the example seating tool 100. A rear opening 310 into the cavity 220 is defined by a rear surface that, in the embodiment shown, includes an upper-rear surface 302, a lower-rear surface 304, a right-rear surface 306, and a left-rear surface 308. Through the rear opening 310, it can be seen that the cavity 310 is defined by an interior wall 320 of the seating tool 100.

The upper-rear surface 302 extends down from the back edge 140 of the top surface 102. In the embodiment shown, the upper-rear surface 302 initially extends downwards perpendicular to the top surface 102 and gradually curves back into the cavity 220. Similarly, the lower-rear surface 304 extends upwards perpendicularly from the bottom surface 202 but extends further before more rapidly curving back into the cavity 220. In other embodiments, the upper- and/or lower-rear surface 302, 304 may extend at different angles and/or transition into the cavity at different rates (e.g., with relatively sharp corners).

The right-rear surface 306 and left-rear surface 308 extend down from the additional edges 150, 160 of the top surface 102. Thus, in the embodiment shown, the right- and left-rear surfaces 306, 308 are at an angle relative to the plane of the drawing. However, in other embodiments (e.g., where the side edges 110, 130 of the top surface 102 connect directly to its rear edge 140) the right- and/or left-rear surface 306, 308 may be parallel to the plane of the drawing. Right- and left-rear surfaces 306, 308 may include cutouts (as shown) to increase the size of the rear opening 310 but this is not required.

The rear opening 310 is generally larger than the front opening 210, although in some embodiments they may be the same size. In the embodiment shown, a flange 230 (also visible in FIG. 2 through the front opening 210) extends upwards into the rear opening from the lower-rear surface 304. The flange 230 extends backwards into the cavity (e.g., to a point approximately halfway between the front opening 210 and the rear opening 310). The flange may be configured to engage with a corresponding slot on a dental appliance removal tool, as discussed in greater detail below with reference to FIGS. 7 and 8. In another embodiment, the flange 230 is omitted.

Figure 4:
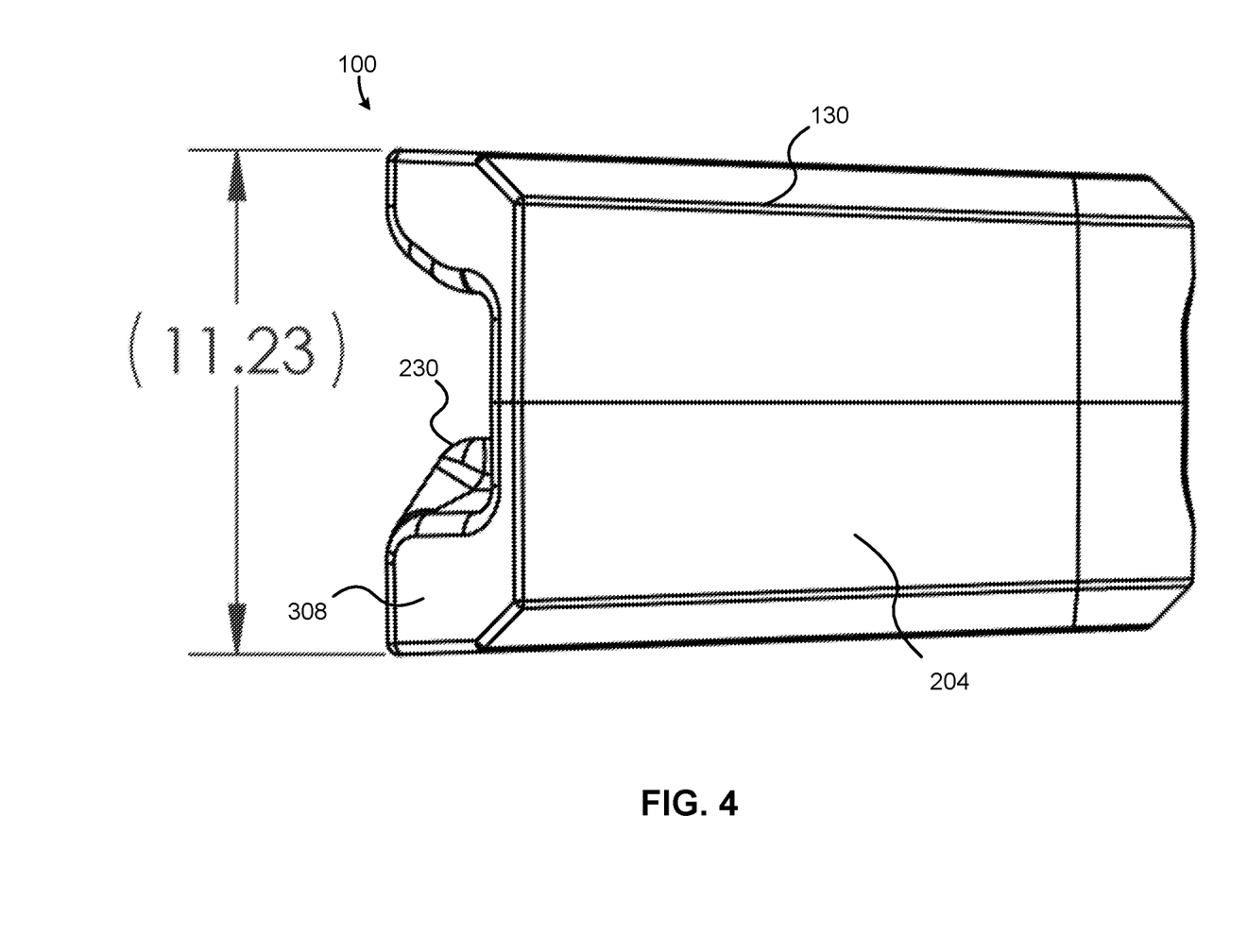
FIG. 4 is a left-side view of the dental appliance seating tool shown in FIG. 1, according to one embodiment.

FIG. 4 shows a left-side view of the example seating tool 100. In the embodiment shown, the seating tool 100 uniformly decreases in height from the rear end to the front end. For example, at the rear end, the seating tool may have a height between ten mm and fifteen millimeters (11.23 mm in the embodiment shown) which may decrease to a height between eight mm and twelve mm at the front end. Alternatively, the seating tool may have a substantially uniform height throughout its length. It can also be seen from this view that the end of the flange 230 of the example seating tool is angled back at approximately thirty degrees. However, in other embodiments, the end of the flange may have other angles.

Figure 5:
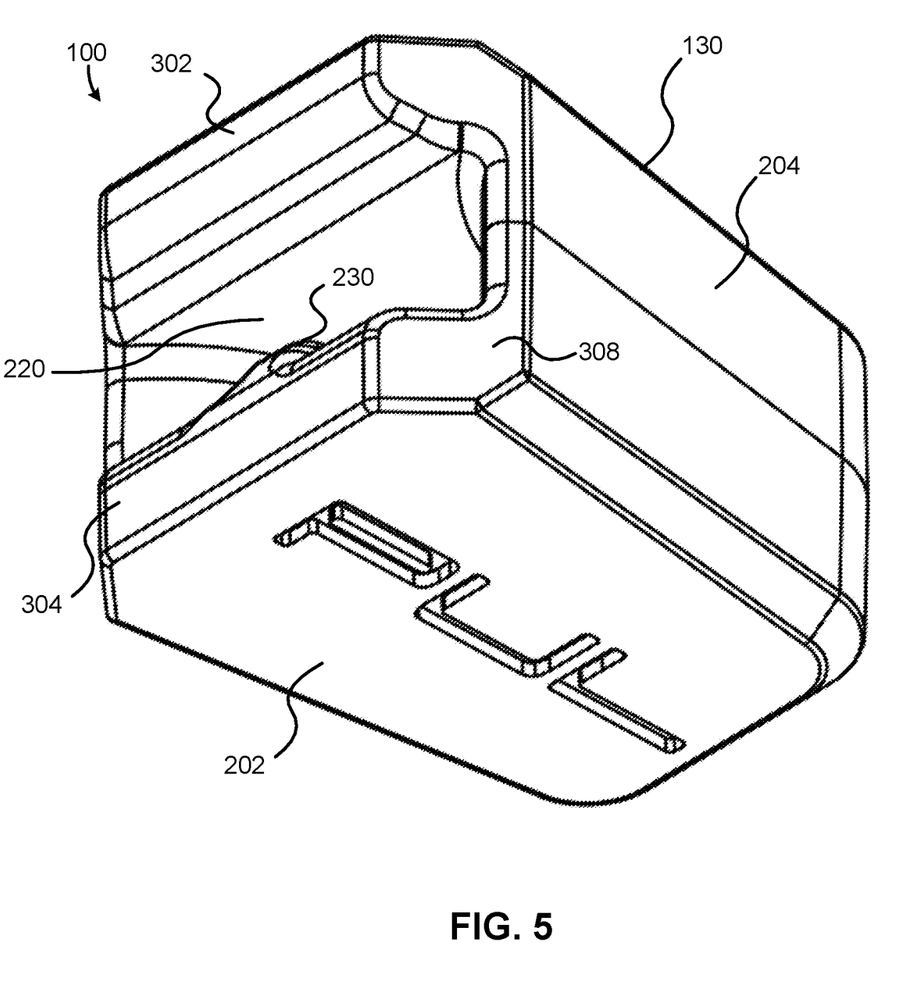
FIG. 5 is a perspective view of the dental appliance seating tool shown in FIG. 1, according to one embodiment.

FIG. 5 shows a bottom-left-rear perspective view of the example seating tool 100. From this perspective, the curves of the upper-rear surface 302 and the lower-rear surface 304 back into the cavity 220 are more readily appreciated. As noted previously, these curves are examples and other embodiments may connect the upper- and lower-rear surface 320, 304 to the interior wall 320 of the cavity 220 in other ways.

Example Combination of Dental Appliance Seating and Removal Tools

Figure 6:
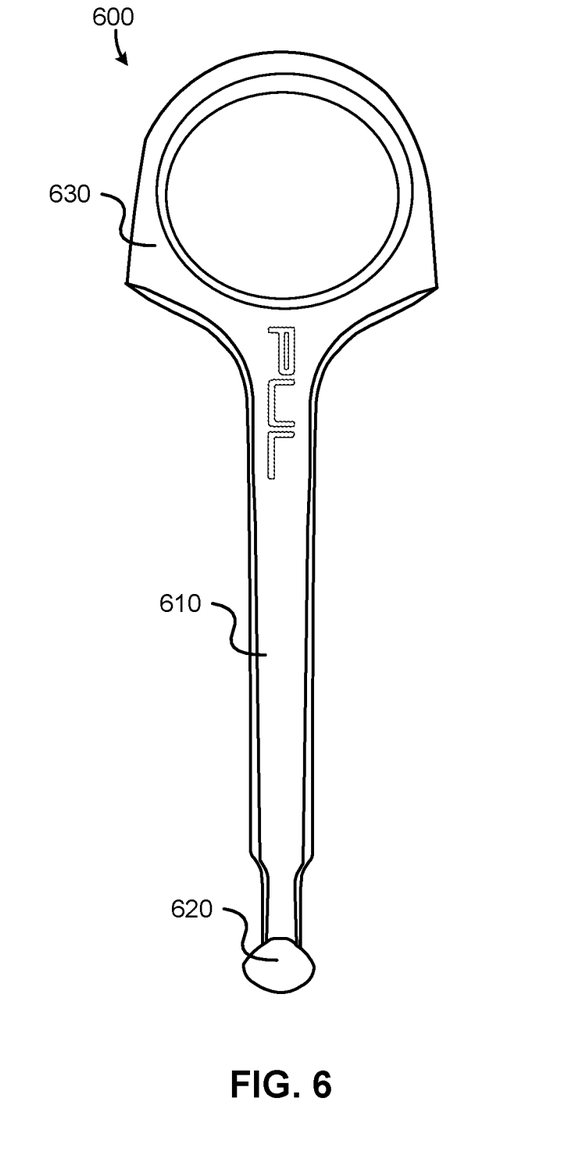
FIG. 6 is a front view of a dental appliance removal tool, according to one embodiment.
Figure 7:
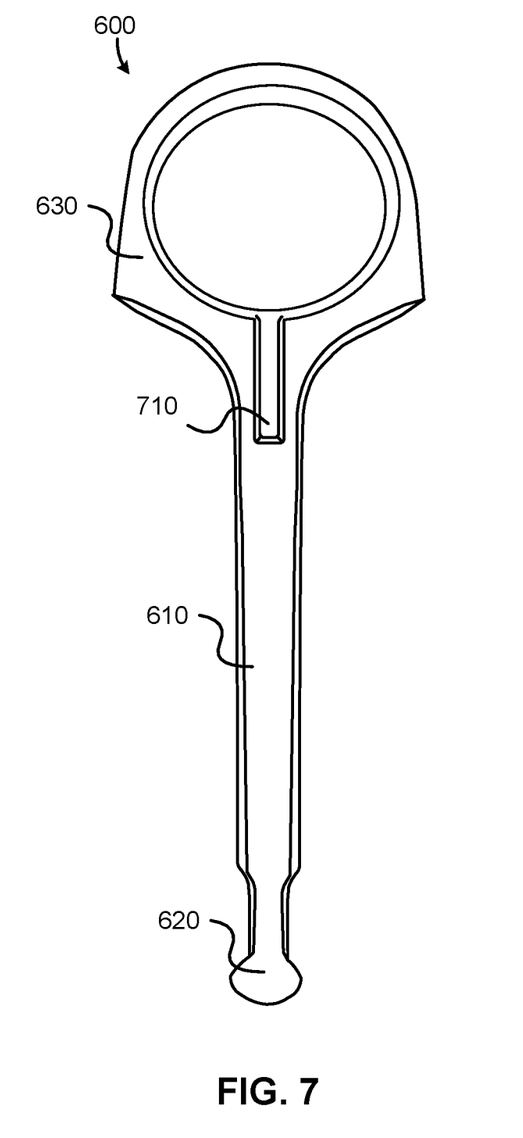
FIG. 7 is a back view of a dental appliance removal tool shown in FIG. 6, according to one embodiment.
Figure 8:
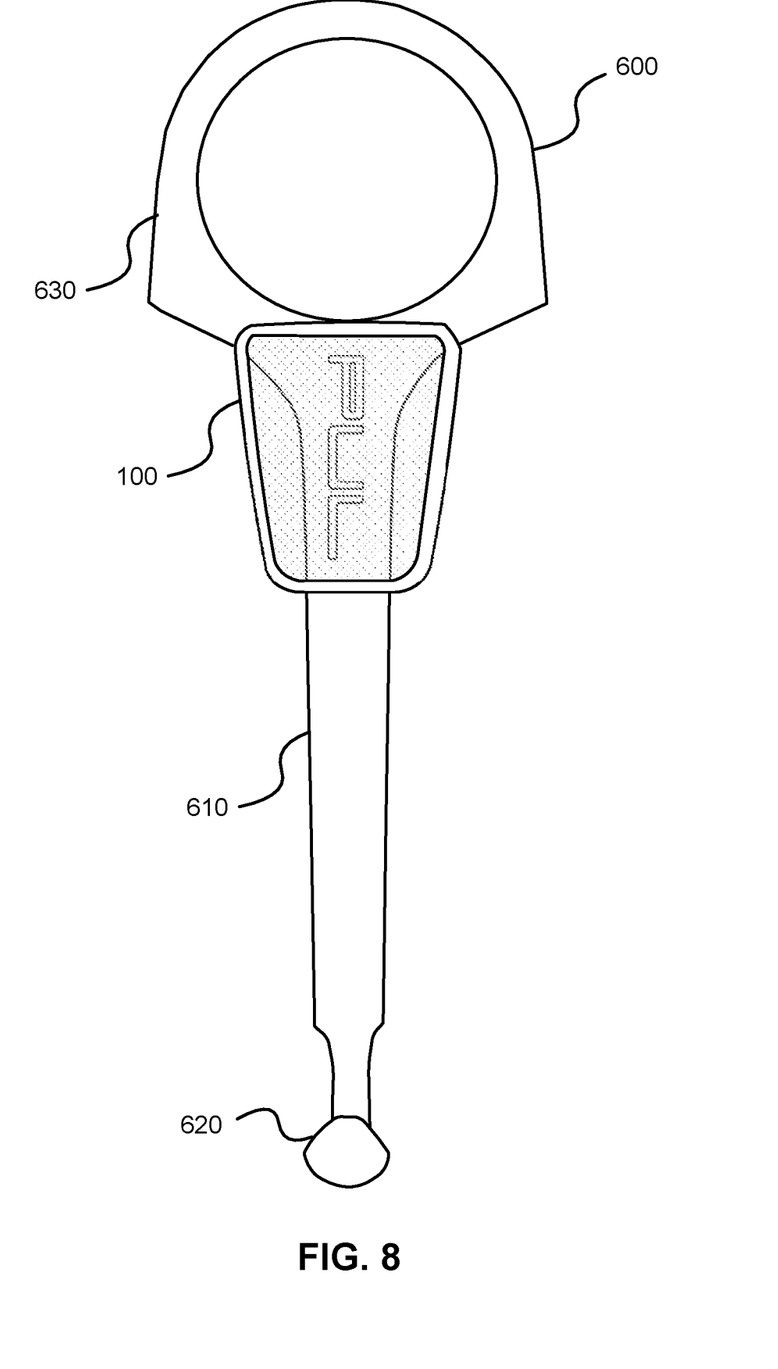
FIG. 8 is a front view of the dental appliance seating tool shown in FIG. 1 connected to the dental appliance removal tool shown in FIG. 6, according to one embodiment.

FIGS. 6 through 8 illustrate an example dental appliance removal tool 600 that is configured to work in conjunction with the seating tool 100, according to one embodiment. FIG. 6 is a front view of the example removal tool 600. In the embodiment shown, the removal tool 600 includes a shaft with a hook 620 on one end and a handle 630 (in this case, a ring) on the opposite end. The hook 620 projects upwards out of the plane of FIG. 6 (i.e., towards the viewer out of the page). In use, a patient holds the handle 630 and engages the hook 620 with a dental appliance in their mouth. The patient then pulls the handle outwards and either down or up (depending on the location of the dental appliance) with sufficient force to remove the dental appliance. The shaft 610 is sufficiently long (e.g., between six and fifteen centimeters) that the patient may remove the dental appliance without placing their fingers inside their mouth (or only slightly inside their mouth). The shaft 610 may have any appropriate cross-section. For example, the shaft 610 may have an approximately rectangular cross section having width and depth between two mm and ten millimeters.

FIG. 7 is a back view of the removal tool 600. In the embodiment shown, there is a slot 710 in the shaft 610 extending from the handle 630 towards the hook 620. The slot 710 may be configured to receive the flange 230 of a seating tool 100 to secure the seating tool in place at the base of the shaft 610 (e.g., for storage). For example, the slot 710 may have a length between ten and thirty millimeters, a width between two and five millimeters, and a depth between one and four millimeters, with the flange 630 having slightly smaller dimensions such that the flange 630 sits snugly within the slot 710 when the seating tool 100 is at the top of the shaft 610, as shown in FIG. 8.

Example Method of Use

As described previously, the seating tool 100 is designed for a patient to insert into their mouth and bite down on to aid in securing a dental appliance. To make positioning the seating tool 100 easier, the patient may attach it to a shaft with a handle (e.g., removal tool 600). For example, a patient may insert the hook 620 and shaft 610 of a removal tool 600 into the rear opening 310 of the seating tool 100, through the cavity 220, and out through the front opening 210. The seating tool 100 is configured to slide up and down the shaft 610 of the removal tool 600. In one embodiment, the size of the front opening 210 of the seating tool 100 is matched to the dimensions of the shaft 610 of the removal tool 600 such that the resulting frictional force is large enough hold the seating tool 100 in place against the force of standard Earth gravity when the shaft is upright (i.e., the weight of the seating tool) but small enough that the patient can easily reposition the seating tool 100 by sliding it along the shaft 610.

Once the seating tool 100 in in place, the patent may hold the handle 630 of the removal tool 600 and insert the shaft 610 (and thus the seating tool 100) into their mouth before biting down on the seating tool 100 to apply the pressure required to correctly seat their dental appliance. The patient may work along their dental arch, positioning the seating tool 100 at different positions by moving the handle 630 and/or sliding the seating tool 100 to a different position on the shaft 620. Thus, by biting down at various locations along their dental arch (e.g., working left to right or vice versa), the patient may correctly seat the dental appliance. When the patient is done, they may slide the seating tool 100 to the top of the shaft 610 such that the flange 230 engages with the slot 710 for storage (in embodiments where a flange and corresponding slot are included).

Additional Considerations

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Furthermore, where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a dental appliance seating tool. Thus, while particular embodiments and applications have been illustrated and described, it is to be understood that the described subject matter is not limited to the precise construction and components disclosed herein and that various modifications, changes and variations which will be apparent to those skilled in the art may be made in the disclosed arrangement, operation, and details. Rather, the scope of protection should be limited only by the following claims.

What is claimed is:

1. A dental appliance seating tool configured for a person to bite and provide sufficient resistive force to aid in seating of a removable dental appliance, the dental appliance seating tool comprising:
   a top surface configured to engage with one or more of the person's upper teeth;
   a bottom surface, opposite and substantially parallel with the top surface, configured to engage with one or more of the person's lower teeth;
   a front surface coupling the top surface to the bottom surface, wherein a height of the front surface measured from the bottom surface to the top surface is in a range from ten millimeters to fifteen millimeters;

a rear surface opposite the front surface, wherein a length of the dental appliance seating tool from the front surface to the rear surface is in a range from ten millimeters to forty millimeters; and an interior wall defining a cavity disposed within a volume defined by the top surface, the bottom surface, the front surface, and the rear surface, the cavity having a front opening defined by the front surface and a rear opening defined by the rear surface, wherein the cavity is configured to enable a shaft to pass through the front and rear openings and allow the dental appliance seating tool to slide along the shaft.

2. The dental appliance seating tool of claim 1, wherein the top surface has a front edge and a back edge, that is substantially parallel to the front edge, and a left edge and a right edge that converge such that the left and right edges are closer together proximate the front edge than proximate the back edge.

3. The dental appliance seating tool of claim 2, wherein the left and right edges converge at an angle of twenty-five degrees or less.

4. The dental appliance seating tool of claim 2, wherein the front edge is connected to the left and right edges by rounded corners and the back edge is connected to the left and right edges by additional edges.

5. The dental appliance seating tool of claim 4, wherein the additional edges are at an approximately forty-five degree angle relative to the back edge.

6. The dental appliance seating tool of claim 1, wherein the rear surface comprises an upper-rear surface above the rear opening and a lower-rear surface below the rear opening.

7. The dental appliance seating tool of claim 6, wherein the rear surface further comprises a left-rear surface and a right-rear surface connecting the upper-rear surface to the lower-rear surface, the left-rear and right-rear surfaces are angled relative to the upper and lower rear surfaces at an angle in a range from ten degrees to eighty degrees.

8. The dental appliance seating tool of claim 1 further comprising a left-side surface between the top surface and the bottom surface and a right-side surface opposite the left-side surface, the dental appliance seating tool having a maximum width between the left-side surface and the right-side surface in a range from ten millimeters to twenty millimeters.

9. The dental appliance seating tool of claim 8, wherein the left-side surface and the right-side surface converge such that the left-side and right-side surfaces are closer together proximate the front surface than proximate the rear surface, the dental appliance seating tool having a minimum width between the left-side surface and the right-side surface in a range from eight millimeters to fifteen millimeters.

10. The dental appliance seating tool of claim 1, wherein a height of the rear surface measured from the top surface to the bottom surface is in a range from eight millimeters to fifteen millimeters.

11. The dental appliance seating tool of claim 1, wherein the front opening is configured such that when the shaft is passing through the front and rear openings, friction between an edge of the front opening and the shaft is sufficient to balance a weight of the dental appliance seating tool.

12. The dental appliance seating tool of claim 1, wherein the front opening is approximately rectangular with width and height in a range from two millimeters to ten millimeters.

13. The dental appliance seating tool of claim 1, further comprising a flange disposed on the interior wall proximate the rear opening, the flange configured to engage with a corresponding slot on the shaft, the slot proximate a first end of the shaft, wherein the flange and slot are configured to hold the dental appliance seating tool in place when the flange is engaged with the slot.

14. The dental appliance seating tool of claim 1, wherein the dental appliance seating tool is made at least in part from a flexible and resilient material that is safe for oral use.

15. The dental appliance seating tool of claim 14, wherein the material is BPA-free food-grade thermoplastic polyurethane.

16. A combined dental appliance removal and seating apparatus comprising the dental appliance seating tool of claim 1 and a dental appliance removal tool comprising the shaft, a hook at one end of the shaft, and a handle at an opposite end of the shaft, wherein the shaft passes through the front opening and the rear opening and the dental appliance seating tool is able to slide along the shaft.

17. A dental appliance seating tool configured to be mounted on second tool comprising a shaft and a hook on one end of the shaft, the dental appliance seating tool further configured to provide sufficient resistive force to aid in seating of a removable dental appliance when a person bites on the dental appliance seating tool while it is mounted on the second tool, the dental appliance seating tool comprising:

a top surface configured to engage with one or more of the person's upper teeth;

a bottom surface, opposite and substantially parallel with the top surface, configured to engage with one or more of the person's lower teeth;

a front surface coupling the top surface to the bottom surface;

a rear surface opposite the front surface; and an interior wall defining a cavity disposed within a volume defined by the top surface, the bottom surface, the front surface, and the rear surface, the cavity having a front opening defined by the front surface and a rear opening defined by the rear surface, wherein the cavity is configured to enable the shaft to pass through the front and rear openings and allow the dental appliance seating tool to slide along the shaft when the dental appliance seating tool is mounted on the second tool, the front opening is configured such that when the shaft is passing through the front and rear openings, friction between an edge of the front opening and the shaft is sufficient to balance a weight of the dental appliance seating tool, and the front and rear openings are configured to allow the hook to pass through enabling mounting and unmounting of the dental appliance seating tool from the second tool.

18. The dental appliance seating tool of claim 17, further comprising a flange disposed on the interior wall proximate the rear opening, the flange configured to engage with a corresponding slot on the shaft, the slot proximate a first end of the shaft, wherein the flange and slot are configured to hold the dental appliance seating tool in place when the flange is engaged with the slot.

19. The dental appliance seating tool of claim 17, wherein a height of the front surface measured from the bottom surface to the top surface is in a range from ten millimeters to fifteen millimeters, and a length of the dental appliance seating tool from the front surface to the rear surface is in a range from ten millimeters to forty millimeters.

20. A method for seating a dental appliance in a user's mouth, the method comprising:
- providing a seating tool mounted on a shaft, wherein the seating tool was mounted by inserting the shaft through a cavity of the seating tool;
- sliding the seating tool to a desired position along the shaft;
- inserting, by the user, the seating tool and at least a portion of the shaft into the user's mouth;
- positioning, by the user, the seating tool at a plurality of positions along the user's dental arch; and
- biting down, by the user, on the seating tool at each of the plurality of positions with sufficient force to correctly seat the dental appliance.

* * * * *